Aug. 28, 1956     L. J. CLARK     2,761,081

DYNAMO ELECTRIC MACHINES

Filed June 1, 1953     2 Sheets-Sheet 1

INVENTOR
LEONARD JACK CLARK,

BY *Miles S. Pillard*

ATTORNEY

Aug. 28, 1956     L. J. CLARK     2,761,081
DYNAMO ELECTRIC MACHINES

Filed June 1, 1953     2 Sheets-Sheet 2

INVENTOR
LEONARD JACK CLARK,
BY
ATTORNEY

United States Patent Office 2,761,081
Patented Aug. 28, 1956

2,761,081

DYNAMO ELECTRIC MACHINES

Leonard Jack Clark, Bilton, Rugby, England, assignor to The British Thomson-Houston Company Limited, a British company Application June 1, 1953, Serial No. 358,696

Claims priority, application Great Britain June 20, 1952

5 Claims. (Cl. 310—159)

This invention relates to dynamo-electric machines and more particularly to alternating current generators for use in aircraft flying at high altitudes.

The object of the present invention is to provide a machine of simple and robust construction which will generate single or polyphase currents without the use of slip-rings, brushes, or other sliding contacts, and will thus be immune from the trouble of excessive and erratic brush-wear frequently experienced at high altitudes.

A similar object has been aimed at by a proposal to construct a composite machine consisting in effect of an alternator and a frequency changer housed in a single frame, but using separate magnetic cores for the two machines. By a specially constructed rotor winding the phase rotation of the currents generated by the alternator is reversed in the frequency changer rotor without employing external sliding connections.

In the present invention the functions of alternator and frequency changer are superimposed in such a way as to be mutually non-interfering in a single machine having one stator and rotor magnetic system.

Figure 1:
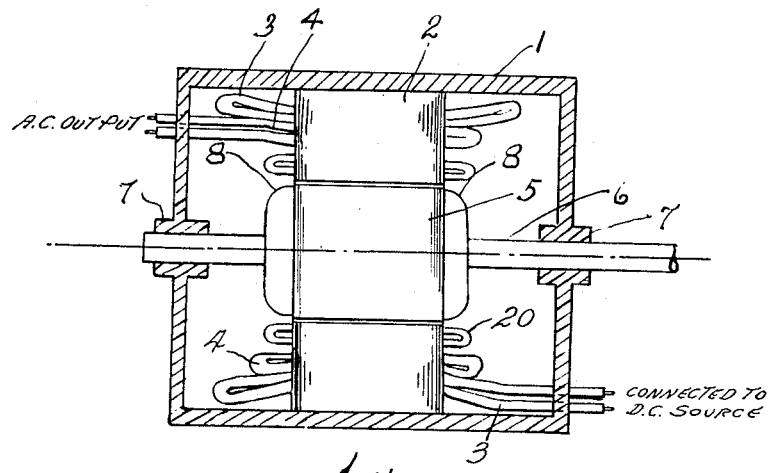
Figure 4:
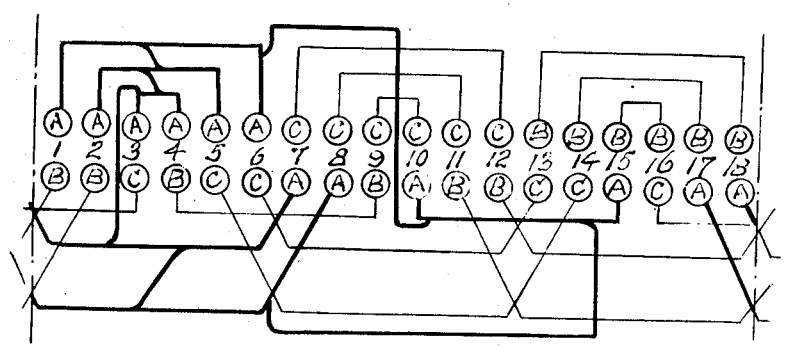
Figure 2:
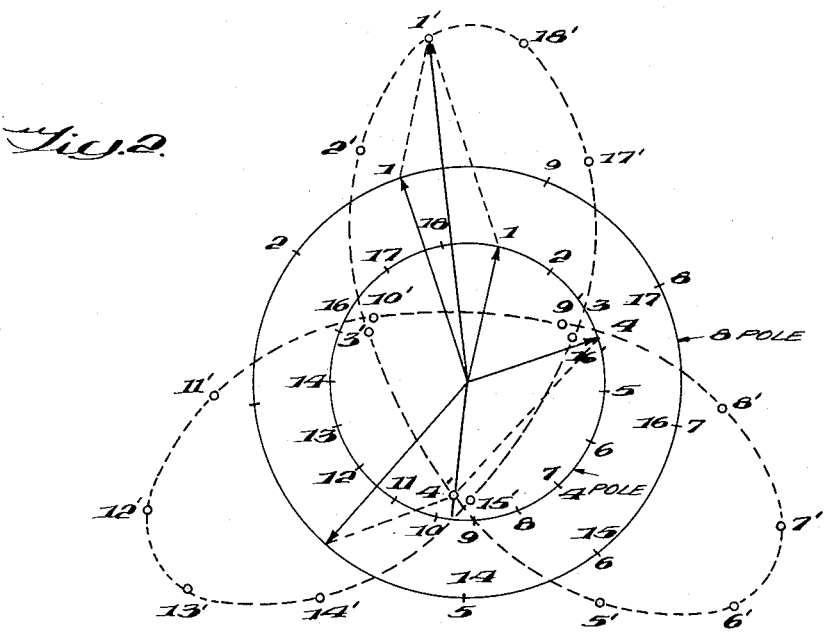
Figure 3:
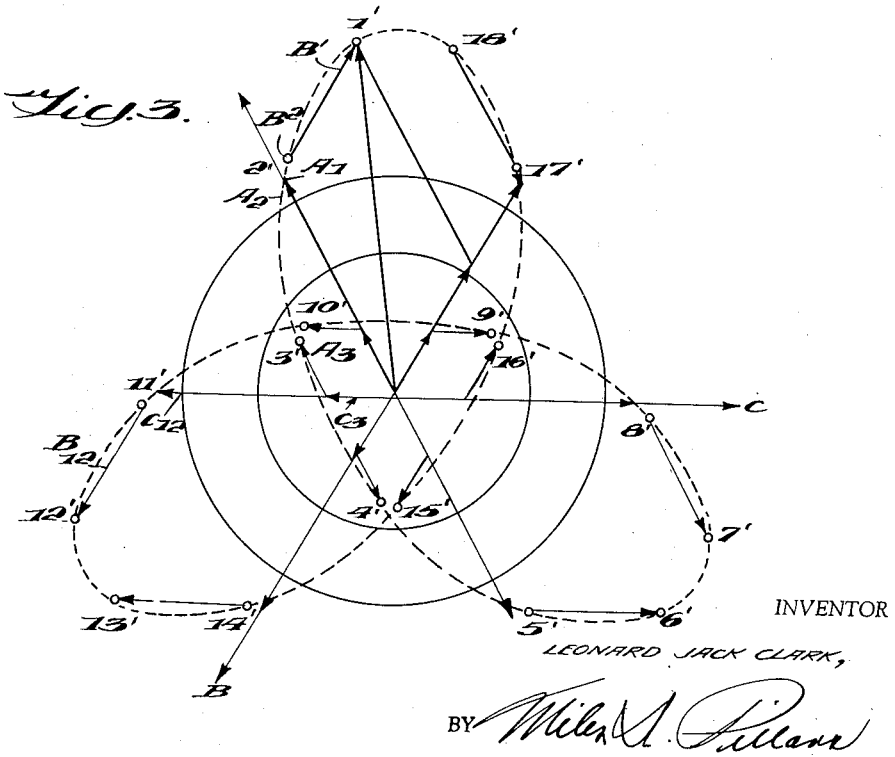

The invention will be more readily understood by reference to the accompanying drawings of which Fig. 1 is a diagrammatic arrangement of one embodiment, Figs. 2 and 3 are vector diagrams illustrating the derivation of one embodiment of a suitable rotor winding, and Fig. 4 is a diagram of the rotor winding derived from the vector diagram of Fig. 3.

Referring to Fig. 1 the machine consists of a frame 1 carrying a stator 2 having inwardly projecting teeth and wound with two windings 3 and 4. A rotor 5 is mounted on a shaft 6 which runs in bearings 7 fixed in frame 1. The rotor consists of a laminated core having slots in which is wound a rotor winding 8.

The stator winding 3 is the field winding and is energized with direct current from a suitable source not shown. The stator winding 4 is an alternating current winding from which the output is taken.

Windings 3 and 4 are arranged so as to be mutually non-inductive, i. e. such that there is zero resultant flux linkage between them.

One way of achieving this is to make the number of poles of one winding twice that of the other. For example 3 could be a two pole winding and 4 a four pole winding, though in practice such a combination is not desirable as it would give rise to unbalanced mechanical forces. In general the difference of the numbers of poles in the two windings should not be less than four i. e. a four pole field winding 3 and an eight pole polyphase output winding 4 would be suitable as in the embodiment described in the following.

The rotor winding 8 is a graded polyphase winding so arranged that when the rotor is caused to rotate by an external power source, not shown, E. M. F.'s induced by the four pole field resulting from winding 3, produce currents which give rise to an eight pole field which is revolving relative to the rotor, and the stator winding 4, which therefore has induced in it an alternating voltage and current.

The currents caused to flow in the rotor winding as a result of cutting the four-pole field are of course four-pole currents and, as stated above these same currents must function as eight pole currents also. The numbers of ampere-conductors in each rotor slot must therefore be at every instant of time the resultant of a set of four-pole ampere-conductors and a set of eight-pole ampere-conductors, and in the present embodiment the phase rotations of the two sets are in opposite senses relative to the rotor itself. In the present embodiment also the rotor has 36 slots, equally spaced. For the four pole field, 18 slots therefore cover 360 electrical degrees while for the eight pole field, the same number of slots cover 720 electrical degrees. The electrical slot pitch is therefore 20 degrees for the four-pole winding and 40 degrees for the eight pole winding.

Fig. 2 is a vector diagram showing the time phase and magnitude of the four pole and eight pole ampere-conductors in each of eighteen slots, and the resultant ampere-conductors required in each slot. The slots are numbered 1 to 18 inclusive. The remaining eighteen slots are a repetition of those shown. The numbered points on the inner circle mark the extremities of time vectors representing the four-pole ampere-conductors in the slots with corresponding reference numbers. The numbered points on the outer circle mark the extremities of time vectors representing the eight pole ampere-conductors.

In the embodiment described the four-pole and eight-pole fields have opposite rotational senses and the progression of the ampere-conductor vectors is therefore opposite. Also since the electrical angle between slots for the eight-pole field is 40° the vectors for the eighteen slots occupy 720 electrical degrees or two complete cycles. The two ampere-conductors vectors in each slot are added and the resultants are indicated by numbers 1' to 18' inclusive. In the embodiment shown they lie on a triple-lobed curve shown dotted.

Each ringed point is the extremity of a time vector representing the total ampere conductors required in the corresponding numbered slot.

In Fig. 3 are reproduced the triple-lobed curve of Fig. 2 and the 1' to 18' inclusive marked points representing the extremities of the required ampere-conductors vectors.

The ampere-conductors in each slot are now resolved into components on two of the three equally spaced phase-axes A, B and C. Thus ampere-conductors in slot 1 are resolved into a vector A1 in phase axis A, and a vector B1 in phase axis B and so on.

It will be noted that vector B1 is of equal magnitude but opposite in sense to vector B12 and these vectors can therefore represent opposite sides of a coil wound in slots 1 and 12.

Similarly the whole of the component-vectors can be paired off and form opposite sides of coils of a three phase winding. The product of the current and turns in each coil must correspond to the length of the component vector which represents it. By winding each coil with a number of turns proportional to the length of the vector the current in each coil will be the same, and all coils of one phase can be connected in series to form a closed circuit. We then have a three phase closed rotor winding as shown in Fig. 4 which represents one half of the actual rotor only i. e. 18 slots, the remainder being a repetition of that shown. In Fig. 4 the connections of one phase only are shown with a heavy line. The other two phases are identical and their coil positions only are indicated by light lines.

The action of the alternator is as follows. When the rotor is revolving and the field winding 3 excited with direct current, to produce a four pole field which will link the rotor winding 8, the latter will have induced in it three phase E. M. F.'s since it consists partly of a three phase four pole winding. As the rotor winding is closed and symmetrical as to the phases, balanced three phase currents will flow. But the winding also consists partly of an eight pole winding, through which the three phase currents flow, and therefore produce an eight pole field, whose phase rotation is opposite to that of the four pole with respect to the rotor. The eight pole field will therefore revolve with respect to the eight pole stator winding 4 and will therefore induce alternating voltages and current in this winding, from which the output can be taken.

The invention is not limited to the use of four and eight poles as described herein. Any suitable combination of pole numbers may be employed provided it is possible to wind the stator winding for those pole numbers that are mutually non-inductive. The two fields need not necessarily rotate in opposite directions with respect to the rotor though this will generally be preferable. The field winding 3 will not occupy the whole of the stator slots and the remaining slots or parts thereof may with advantage be occupied with a short circuited winding or windings 20 of the same number of poles as the field winding, and non-inductive to the eight pole winding to act as a damping winding.

The field winding 3 can with advantage, but not necessarily, be sinusoidally distributed.

What I claim as new and desire to secure by Letters Patent of the United States is:

1. A dynamo-electric machine comprising a stator, a rotor cooperating therewith and inductively related thereto, said stator consisting of a laminated magnetic member having teeth projecting into proximity with the periphery of the rotor, two multi-pole windings uniformly positioned on said stator and wound in the slots between said teeth, one of said windings being adapted to be supplied with field current from a direct current source, and the other winding being an alternating current output winding, said output winding having a larger number of poles than that of said one winding and said windings being wound so as to be mutually non-inductive, and said rotor consisting of a laminated core having a slotted periphery in which is embedded a closed, distributed polyphase winding having no external connection, said rotor winding, on rotation with relation to the stator, having induced therein by the field resulting from the direct current excitation of the field winding on said stator a current which produces a field rotating with relation to said rotor and to said stator whereby to induce an alternating E. M. F. in the output winding on said stator.

2. A dynamo-electric machine comprising a stator, a rotor cooperating therewith and inductively related thereto, said stator consisting of a laminated magnetic member having teeth projecting into proximity with the periphery of the rotor, two multi-pole windings uniformly positioned on said stator and wound in the slots between said teeth, one of said windings being adapted to be supplied with field current from a direct current source, and the other winding being an alternating current output winding, said output winding having twice the number of poles of said one winding and said windings being wound so as to be mutually non-inductive, and said rotor consisting of a laminated core having a slotted periphery in which is embedded a closed, distributed polyphase winding having no external connection, said rotor winding, on rotation with relation to the stator, having induced therein by the field resulting from the direct current excitation of the field winding on said stator a current which produces a field rotating with relation to said rotor and to said stator whereby to induce an alternating E. M. F. in the output winding on said stator.

3. A dynamo-electric machine as claimed in claim 2, in which the field resulting from the direct current excitation on said stator rotates with reference to said rotor in the opposite direction from that of said rotor.

4. A dynamo-electric machine comprising a stator, a rotor cooperating therewith and inductively related thereto, said stator consisting of a laminated magnetic member having teeth projecting into proximity with the periphery of said rotor, a 4-pole field winding uniformly wound on said stator, said field winding being adapted to be excited with direct current, an 8-pole A. C. output winding uniformly wound on said stator, said field and output windings being wound so as to be mutually non-inductive so that there is zero resultant flux leakage between them, and said rotor consisting of a laminated core having a slotted periphery in which is wound a closed polyphase winding having no external connection, said rotor winding, when rotated with relation to said stator, having induced therein by the field resulting from the direct current excitation of the field winding on said stator currents which produce an 8-pole field rotating with reference to said rotor in the opposite direction to that of said rotor, whereby to induce an alternating E. M. F. in said output winding.

5. A dynamo-electric machine as claimed in claim 4, having a short-circuited damping winding in said stator, said damping winding being a 4-pole winding non-inductive to said output winding.

References Cited in the file of this patent

UNITED STATES PATENTS 1,404,885   Nyman _____ Jan. 31, 1922